(12) United States Patent
Solotorevsky et al.

(10) Patent No.: US 8,108,243 B2
(45) Date of Patent: Jan. 31, 2012

(54) METHODS, SYSTEMS AND COMPUTER READABLE CODE FOR FORECASTING TIME SERIES AND FOR FORECASTING COMMODITY CONSUMPTION

(75) Inventors: Gad Solotorevsky, Even Yehuda (IL); Sveta Pedan, Heatherton (AU)

(73) Assignee: Cvidya Networks, Tel-Aviv (IL)

( * ) Notice: Subject to any disclaimer, the term of this patent is extended or adjusted under 35 U.S.C. 154(b) by 685 days.

(21) Appl. No.: 11/570,775

(22) PCT Filed: Jun. 19, 2005

(86) PCT No.: PCT/IL2005/000654
§ 371 (c)(1),
(2), (4) Date: Dec. 18, 2006

(87) PCT Pub. No.: WO2005/124718
PCT Pub. Date: Dec. 29, 2005

(65) Prior Publication Data
US 2008/0059284 A1 Mar. 6, 2008

Related U.S. Application Data

(60) Provisional application No. 60/580,358, filed on Jun. 18, 2004.

(51) Int. Cl.
*G06F 9/44* (2006.01)
(52) U.S. Cl. .................................... 705/7.29
(58) Field of Classification Search .................. 705/7.29
See application file for complete search history.

(56) References Cited

U.S. PATENT DOCUMENTS

| | | | |
|---|---|---|---|
| 5,884,037 A | 3/1999 | Aras et al. | |
| 5,983,251 A * | 11/1999 | Martens et al. | 708/203 |
| 6,032,125 A | 2/2000 | Ando | |
| 6,125,105 A | 9/2000 | Edwards et al. | |
| 6,266,658 B1 * | 7/2001 | Adya et al. | 707/2 |
| 6,272,364 B1 | 8/2001 | Kurnik | |
| 6,297,825 B1 * | 10/2001 | Madden et al. | 345/419 |
| 6,535,817 B1 | 3/2003 | Krishnamurti | |
| 6,546,269 B1 | 4/2003 | Kurnik | |

(Continued)

OTHER PUBLICATIONS

Vision [CiteSeer; NEC Research Institute; Steve Lawrence, Kurt Blooacker, Lee Giles], Apr. 17, 2004, Internet Archive Way Back Machine—http://web.archive.org/web/20040417201159/http://citeseer.ist.psu.edu/MachineLearning/Vision/.*

(Continued)

*Primary Examiner* — Romain Jeanty
(74) *Attorney, Agent, or Firm* — Browdy and Neimark, PLLC (57) ABSTRACT

Methods, systems and computer readable code for forecasting commodity consumption and for forecasting time series are provided. According to some embodiments, the forecasting includes deriving at least one population commodity consumption forecasting model from population historical consumption data, deriving an individual commodity consumption forecasting model for at least one individual of the population from at least one population commodity consumption forecasting model and from individual historical consumption data, and forecasting future individual commodity consumption for the individual using individual commodity consumption forecasting model. According to some embodiments, the presently disclosed forecasting includes forecasting future values of an individual time series within a population of time series, where each time series on the same domain. Thus, according to some embodiments, the forecasting includes deriving at least one population forecasting model from past values of the population of time series, deriving an individual time series for at least one individual time series forecasting model from past individual time series values and from at least one population forecasting model and forecasting future values of said individual time series using the individual time series forecasting model.

14 Claims, 8 Drawing Sheets

U.S. PATENT DOCUMENTS

| | | | | |
|---|---|---|---|---|
| 6,611,726 | B1* | 8/2003 | Crosswhite | 700/99 |
| 6,658,396 | B1* | 12/2003 | Tang et al. | 706/17 |
| 6,745,150 | B1* | 6/2004 | Breiman | 702/181 |
| 6,816,839 | B1* | 11/2004 | Gung et al. | 705/10 |
| 6,996,508 | B1* | 2/2006 | Culp et al. | 703/2 |
| 7,406,435 | B2* | 7/2008 | Aronowich et al. | 705/10 |
| 2001/0013008 | A1 | 8/2001 | Waclawski | |
| 2003/0177057 | A1* | 9/2003 | Aronowich et al. | 705/10 |
| 2003/0200134 | A1* | 10/2003 | Leonard et al. | 705/10 |
| 2005/0076283 | A1* | 4/2005 | Malkamaki et al. | 714/748 |
| 2008/0097802 | A1* | 4/2008 | Ladde et al. | 705/7 |
| 2008/0249845 | A1* | 10/2008 | Aronowich et al. | 705/10 |

OTHER PUBLICATIONS

Paul Kalungi, Tiky T. Tanyimboh, Department of Civil Engineering, University of Liverpool, "Redundancy Model for Water Distribution Systems", 2003, Reliability Engineering and System Safety, 82 (2003) pp. 275-286.*

"Efficacy of a Predictive Display, Steering Device, and Vehicle Body Representation in the Operation of a Lunar Vehicle" By Mathan, Hyndman, Fischer et al; Department of Computer Science-Carnegie Mellon Univ.; http://www.acm.org/sigchi/chi96/chi96/proceedings/intpost/Mathan/ms_txt.HTM.

George E.P. Box et al., "Time Series Analysis: Forecasting and control,"3rd Edition, Prentice Hall, Feb. 9, 1994.

Gilchrist W., *Statistical Forecasting*, John Wiley & Sons; Dec. 1976.

Wolski R., Cluster Computing, vol. 1, No. 1,pp. 119-132, 1998.

Clements M., and Hendry D., "Forecasting Economic Time Series", Cambridge University Press,1998.

T.N. Krishnamurti et al "Improved Weather and Seasonal Climate Forecasts from Multimodel Superensemble", *Science* vol. 285 No. 5433, pp. 559-583, 1989.

Cesa-Bianchi N., et al "How to use expert advice." *Journal of the Association for Computing Machinery*, vol. 44, No. 3,pp. 427-485 ,May 1997.

Clemen R.T.,"Combining Forecasts", International Journal of Forecasting, No. 5, pp. 559-583, 1989.

Clements M., and Hendry D., *Forecasting Economic Time Series*, Cambridge University Press, 1998.

Herbster M., and Warmuth M. "Tracking the best expert." In *Proceedings of the twelth International Conference on Machine Learning*, pp. 286-294, 1995.

Opitz D.W., and Shavilik IW., "Generating Accurate and Diverse Members of a Neural Network Ensemble," *Advances in Neural Information Processing Systems*, vol. 8, The MIT Press, 535-541, 1996.

Krogh A., and Vedelsby J., "Neural Network Ensembles, Cross Validation, and Active Learning," *Advances in Neural Information Processing Systems*, vol. 7, The MIT Press, pp. 231-238 1995.

Thompson, P.D. "How to improve accuracy by Combining independent forecasts" Mon. Wea. Rev., 105, 228-229,1977.

* cited by examiner

500
- *Max* is the maximal number of models to be selected
- *Sel* = {} is the set of the models selected
- ValArr is a two dimensional array of size rXm which contains the value of model i to test case j
- MinDistance is the minimal distance required between *Sel* and a candidate model in order to consider the addition of the model to *Sel*

510
s = 0

520
Select i such that
$A_i \notin Sel \land Distance(A_i, Sel) \geq MinDistance \land$
$\left( \forall l \left( \begin{array}{l} l \neq i \land A_l \notin Sel \land Distance(A_l, Sel) \geq MinDistance \rightarrow \\ \sum_{j=1}^{m} ValArr_1[i,j] \leq \sum_{j=1}^{m} ValArr_1[l,j] \end{array} \right) \right)$ 530 If failed to select i — Yes →

No ↓

540
Append $A_i$ To Sel 550
s = s+1

560 If s <= Max

Yes (loop back) / No → 570 halt

METHODS, SYSTEMS AND COMPUTER READABLE CODE FOR FORECASTING TIME SERIES AND FOR FORECASTING COMMODITY CONSUMPTION

FIELD OF THE INVENTION

The present invention relates to methods and systems for forecasting commodity consumption and for forecasting time series.

BACKGROUND OF THE INVENTION

Forecasting Time Series

A time series is a sequence of observations that are ordered in time (e.g., observations made at evenly spaced time intervals). Some examples of time series data may include end-of-month stock prices for General Electric, hits per day at a web site, the volume of usage of a communications network, weekly sales of Windows XP, electrical demand per hour in Seattle, daily high tide readings in San Francisco Bay, etc.

Various forecasting methods exist that attempt to predict future values of the time series based on the past time series data. Some forecasting methods are as simple as continuing the trend curve smoothly by a straight line. Other forecasting methods are more sophisticated. The most well known and widely used method is the ARIMA procedure (auto-regression and moving averages) due to Box and Jenkins (George E. P. Box, et al., "Time Series Analysis: Forecasting And Control," 3rd Edition, Prentice Hall, Feb. 9, 1994), a procedure which assumes that each measurement in a time series is generated by a linear combination of past measurements plus noise.

Statistical methods (Gilchrist W., *Statistical Forecasting*, John Wiley & Sons; December 1976) related to solving forecast problems include Taylor Series Exponential Smoothing, Decision Trees, Neural Network and Heuristic Networks.

There are a number of publications describing time series forecasting as applied to a number of problems. Thus, time series have proven useful for forecasting usage of network resources (see U.S. Pat. No. 5,884,037, U.S. Pat. No. 6,125, 105, US 2001/0013008 the disclosures of which are incorporated herein by reference). Another disclosure providing potentially relevant background information is Wolski R., Dynamically forecasting network performance using the Network Weather Service, (Cluster Computing, vol., 1, num. 1, pp. 119-132, 1998).

Other applications of time series forecasting include the forecasting of glucose concentration (see U.S. Pat. No. 6,272, 364 and U.S. Pat. No. 6,546,269 the disclosures of which are incorporated herein by reference), and the forecasting of macroeconomic data (see Clements M., and Hendry D., "Forecasting Economic Time Series", Cambridge University Press, 1998)

One known technique for improving forecast quality is to use a multiple forecasting model which combines forecasts obtained from a plurality of different forecasting models. For example, U.S. Pat. No. 6,535,817, the disclosure of which is incorporated herein by reference, discloses methods, systems and computer program products for generating weather forecasts from a multi-model superensemble. In particular, U.S. Pat. No. 6,535,817 and T. N. Krishnamurti et al. "Improved Weather and Seasonal Climate Forecasts from Multimodel Superensemble", *Science*, vol. 285 No. 5433, pp 1548-1550, Sep. 3, 1999 disclose the generation of a model that combines the historical performance of forecasting data from multiple weather forecasting models over a large number of geographic areas or regions to produce an unifying forecast.

U.S. Pat. No. 6,032,125 discloses the use of a plurality of neural networks to forecast the sales of products.

Other disclosures providing potentially relevant background material and related to combining forecasts include:

Cesa-Bianchi N., et al. "How to use expert advice." *Journal of the Association for Computing Machinery*, Vol. 44, No. 3, pp. 427-485, May 1997;

Clemen R. T., "Combining Forecasts", *International Journal of Forecasting*, No. 5, pp 559-583, 1989;

Clements M., and Hendry D., *Forecasting Economic Time Series*, Cambridge University Press, 1998;

Herbster M., and Warmuth M. "Tracking the best expert." In *Proceedings of the Twelfth International Conference on Machine Learning*, pages 286-294, 1995

Opitz D. W., and Shavlik I W., "Generating Accurate and Diverse Members of a Neural-Network Ensemble," *Advances in Neural Information Processing Systems*, vol. 8, The MIT Press, pp. 535-541, 1996.

Krogh A., and Vedelsby J., "Neural Network Ensembles, Cross Validation, and Active Learning," *Advances in Neural Information Processing Systems*, vol. 7, The MIT Press, pp. 231-238, 1995;

Thompson, P. D. "How to improve accuracy by combining independent forecasts" *Mon. Wea. Rev.,* 105, 228-229, 1977.

In general, there are a number of difficulties which need to be overcome when combining forecasting models. For applications where limited computational resources is a factor, care must be taken to avoid or minimize redundancy between forecasting models. Furthermore, it is not always clear a priori how much weight to assign to each of the constitutive forecast models. In situations where there are numerous models to be combined and numerous time series to be forecast the computational costs associated with building appropriate forecasting model for each time series can be prohibitive. Finally, it is noted that issues associated with model overfitting can be difficult to treat appropriately in a combined model.

An important application of time series forecasting methods is the prediction of the future consumption of a commodity from historical consumption data. Exemplary commodities include electricity, natural resources, network bandwidth, and money spent in a retail store.

Forecasting Commodity Consumption by Individuals

Although techniques for forecasting consumption of commodities by an entire population have been disclosed, the more difficult task of predicting future consumption of commodities individual consumers within a population of consumers remains an open problem. While the former problem addresses the question "how much of the commodity in total will be consumed at a certain time" the latter problem attempts to forecast "how much will each specific consumer within the large population consume at a certain time."

The differences between these two problems are substantial. Thus, for many applications the number of commodities to be forecasted is typically small, and the number of consumers is typically large. Because certain consumers exhibit irregular consumption habits, the forecasting of commodity consumption by individual consumers is prone either to overfitting or to large inexactitudes. Furthermore, it is noted that in the interests of building an accurate model, it is, for many applications, desirable to combine forecasting models. For the specific case where a forecast model is needed for a large number of consumers, this can be computationally expensive if specific forecasting models for each individual consumer are combined.

There is an ongoing need for models, systems and computer readable code for forecasting commodity consumptions of individuals within large, non-homogenous populations. One exemplary commercial application relates to comparing predicted future commodity consumption values with actual commodity consumption values. In one specific example, an individual customer consumes wireless telephone services from several providers. Should the individual under-consume the telephone services as compared to the forecast consumption, it could indicate that the consumer has switched to another provider. According to this example, it could be advantageous to offer a discount in order to stimulate consumption of the wireless service by the individual customer.

SUMMARY OF THE INVENTION

The aforementioned needs are satisfied by several aspects of the present invention.

It is now disclosed for the first time a method of forecasting commodity consumption by an individual within a population. The presently disclosed method includes deriving at least one population commodity consumption forecasting model from population historical consumption data, deriving an individual commodity consumption forecasting model for at least one individual of the population from at least one population commodity consumption forecasting model and from individual historical consumption data, and forecasting future individual commodity consumption for the individual using the individual commodity consumption forecasting model.

According to some embodiments, the population historical consumption data and/or the individual historical consumption data is provided as a time series.

According to some embodiments, the population historical consumption data includes data from a representative subset of the population.

Any technique known in the art for obtaining a data from a representative subset is appropriate for the present invention. According to some embodiments, the representative subset is a randomly selected subset.

There is no specific limitation in how the population commodity consumption forecasting model is derived. According to some embodiments, the step of deriving at least one population commodity consumption forecast model includes selecting at least one population commodity consumption forecast model from a plurality of candidate forecast models.

According to some embodiments, selection includes evaluating a forecast quality of the candidate forecast model using the population historical data as a training set.

According to some embodiments, the evaluating of the forecast quality includes determining an aggregate function of qualities of individual forecasts for a plurality of subsets of the population historical data.

According to some embodiments, selection includes an iterative process wherein individual candidate forecast models are appended to a set of previously selected candidate forecast models.

There is no specific limitation on the model selection process. According to some embodiments, the selection process is a greedy selection process.

According to some embodiments, the step of selecting includes employing a genetic selection algorithm.

According to some embodiments, the appending of a single candidate forecast model includes comparing forecast qualities of unchosen candidate forecast models.

According to some embodiments, the single appended forecast model has the best forecast quality among previously unchosen the candidate forecast models.

According to some embodiments, appending of a single candidate forecast model includes analyzing a redundancy parameter of unchosen candidate forecast models relative to set of said previously chosen candidate forecast models. Thus, according to some embodiments, candidate models which add information to the previously chosen forecast models are chosen.

According to some embodiments, the stage of selecting excludes analyzing forecast quality of a combination of said candidate models.

According to some embodiments, a plurality of population commodity consumption forecasting models is derived.

According to some embodiments, the deriving of the individual commodity consumption forecasting model includes forming a weighted combination of population commodity consumption forecasting models selected from the plurality.

According to some embodiments, the weight coefficients are derived by analyzing forecast quality of a population commodity consumption forecasting model on the individual historical data.

According to some embodiments, at least one forecast model selected from the group consisting of the population commodity consumption forecasting model and the individual commodity consumption forecasting model is derived from a statistical forecast model.

According to some embodiments, deriving of the at least one population commodity consumption forecasting model includes deriving a first population commodity consumption forecasting model from a first subset of population historical consumption data and deriving a second population commodity consumption forecasting model from a second subset of the population historical consumption data.

There is no limitation on the type of forecast model. Exemplary forecast models include but are not limited to a statistical models, pure statistical models, neural networks, decision trees, heuristic algorithms, simulated annealing algorithms, and genetic algorithms. Furthermore, it is appreciated that any equivalent forecast model or combination of the aforementioned forecast models is appropriate for the present invention.

According to some embodiments, the forecasting of the future individual commodity consumption includes forecasting a network bandwidth consumption.

It is now disclosed for the first time a system for forecasting commodity consumption by an individual within a population. The presently disclosed system includes a population model input for receiving at least one population commodity consumption model associated with population historical consumption data, a consumption data input for receiving individual historical consumption data for at least one individual, a model formulator for deriving from the at least one population commodity consumption model and from the individual historical consumption data an individual commodity consumption forecasting model, and a forecasting unit for outputting a future individual commodity consumption using the individual commodity consumption forecasting model.

According to some embodiments, the population model input is operative to receive a plurality of candidate population commodity consumption models and the model formulator includes a population model selector for selecting at least one population commodity consumption model from a plurality of candidate models.

According to some embodiments, the model formulator is operative to derive the individual commodity consumption forecasting model from a plurality of the population commodity consumption models, and the model formulator includes a model combiner for producing a combined model from the plurality of models and from the individual consumption data for an individual.

According to some embodiments, the model combiner includes a coefficient generator for generating weighting coefficients for the plurality of models.

According to some embodiments, the model formulator includes a model forecast quality analyzer for analyzing a forecast quality associated with the population commodity consumption model relative to the individual historical consumption data of an individual.

It is now disclosed for the first time a computer readable storage medium having computer readable code embodied in the computer readable storage medium, the computer readable code for forecasting commodity consumption by an individual within a population, the computer readable code comprising instructions for deriving at least one population commodity consumption forecasting model from population historical consumption data, deriving an individual commodity consumption forecasting model for at least one individual of the population from at least one population commodity consumption forecasting model and from individual historical consumption data, and forecasting future individual commodity consumption for the individual using the individual commodity consumption forecasting model.

It is now disclosed for the first time a method of forecasting future values of an individual time series within a population of time series, each time series on the same domain, the method. The presently disclosed method includes deriving at least one population forecasting model from past values of the population of time series, deriving for at least one individual time series an individual time series forecasting model from past individual time series values and from the at least one population forecasting model, and forecasting future values of the individual time series using the individual time series forecasting model.

According to some embodiments, the population forecasting model is operative to forecast future values of the population of time series.

It is now disclosed for the first time computer readable storage medium having computer readable code embodied in the computer readable storage medium, the computer readable code for forecasting future values of an individual time series within a population of time series, each time series on the same domain. The presently disclosed computer readable code includes instructions for deriving at least one population forecasting model from past values of the population of time series, deriving at least one individual time series an individual time series forecasting model from past individual time series values and from the at least one population forecasting model and forecasting future values of the individual time series using the individual time series forecasting model.

It is now disclosed for the first time a system for forecasting future values of an individual time series within a population of time series, each time series on the same domain. The system presently disclosed system includes a population model input for receiving at least one population forecasting model operative to forecast future values associated with the population of time series, an individual time series input for receiving at least one individual time series, a model formulator for deriving an individual time series forecasting model from past values of the received individual time series and from the received at least one population forecasting model and a forecasting unit for forecasting future values of the individual time series using the individual time series forecasting model.

These and further embodiments will be apparent from the detailed description and examples that follow.

DETAILED DESCRIPTION OF THE INVENTION

The present invention will now be described in terms of specific, example embodiments. It is to be understood that the invention is not limited to the example embodiments disclosed. It should also be understood that not every feature of the method and system for forecasting large numbers of time series of the same domain and/or for forecasting commodity consumption is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

Exemplary embodiments of the present invention will be explained in terms of forecasting commodity consumption by an individual based on both population and individual historical data. The historical data in the presently presented examples is provided as time series data, though it is understood that this is not a limitation of the present invention, and individual and/or population historical data can be provided in any form appropriate for the building of forecast models.

As used herein, "individual historical data" is data about past commodity consumption by an individual within a population of individuals. According to some embodiments, the individual historical data is provided as time series data, i.e. a set of values for specific times or time periods, where each value represents a quantity of commodity consumed by the individual at the specific time or during the specific time period.

In some embodiments, "population historical data" is data related to past commodity consumption by a population of individuals. According to some embodiments, the population historical data is provided as time series data, i.e. a set of values for specific times or time periods, where each value represents a quantity of commodity consumed at the specific time or during the specific time period. According to some embodiments, this quantity of commodity consumed relates to an aggregate commodity consumption by the entire population. Alternatively or additionally, population historical data relates to actual commodity consumption by actual individuals selected from the population, e.g. individuals who are from a representative subset of the population including but not limited to a randomly selected subset of the population.

In some embodiments, the population is represented by a set of individuals, e.g. a representative subset of the population, and each individual is represented by the respective individual historical data.

According to some embodiments, the population is a "large" population, e.g. at least thousands, at least millions.

Furthermore, it will be appreciated that the presently presented methods and systems for forecasting future values of a time series representing commodity consumption are also applicable for forecasting future values of any individual time series of a given domain from a population of multiple time series of the same domain.

Exemplary time series domains and examples of consumed commodities include but are not limited to hourly usage of bandwidth by each of the consumers (users) of a communications network, or time series of daily expenses of each consumer (customer) of a retail store. Both of these aforementioned time series describe commodity consumption, where in the case of the communications network the bandwidth functions as the resource, while in the specific case of the retail store money spent is the specific resource consumed.

The term multiple time series addresses numbers starting from two time series up to and beyond hundreds of millions of time series. In the communication network, for example, there may be millions of users, the retail store example may be thousands of customers, etc.

In accordance with some embodiments of the present invention, methods, systems and computer readable code for forecasting are disclosed. It is noted that unless specified otherwise, these methods, systems and computer readable code can be implemented as software, hardware, or a combination thereof.

It is noted that throughout the figures, variables are defined as follows:

i,l are dummy variables to iterate over population forecast models;

$Q_h$ represents a single time series related to the population;

h is a dummy variable to iterate over single time series related to the population;

j is a dummy variable to iterate historical population test cases $P_j$ related to time series of population historical data; for the embodiments presented in the figures, each test case $P_j$ is given as a five-tuple $(Q_h, H_{k,start}, H_{k,end}, T_{k,start}, T_{k,end})$;

k is a dummy variable to iterate over pairings between history periods (H) and test forecasting periods (T);

L represents the total number of time series associated with the population;

$ValArr_1[i,j]$ represents an evaluation of the effectiveness of the ith population forecast model on the jth test case of data;

r is a total number of candidate population forecasting models (including both those eventually selected and those rejected);

m is the number of test cases selected from population historical data;

Max is the total number of population forecasting models selected;

Sel represents the set of already selected population forecast models;

s is the number of population forecast models in the set Sel, $S_1 \ldots S_N$ are time series related to single individual for a single forecasting period F;

$\alpha$ is a dummy variable to iterate historical individual test cases $I_\alpha$ associated with a single individual; each individual test case $I_\alpha$ is given as a five-tuple $(S_\beta, H_{k,start}, H_{k,end}, T_{k,start}, T_{k,end})$.

n is the number of test cases selected from individual historical data for the particular individual;

$ValArr_2[i,\alpha]$ represents an evaluation of the effectiveness of the ith population forecast model on the $\alpha$th test case of data;

N is the total number of time series for single individual related to a single forecasting period F; According to some embodiments, each individual can have more than one relevant time series (e.g. N>1).

Figure 1:
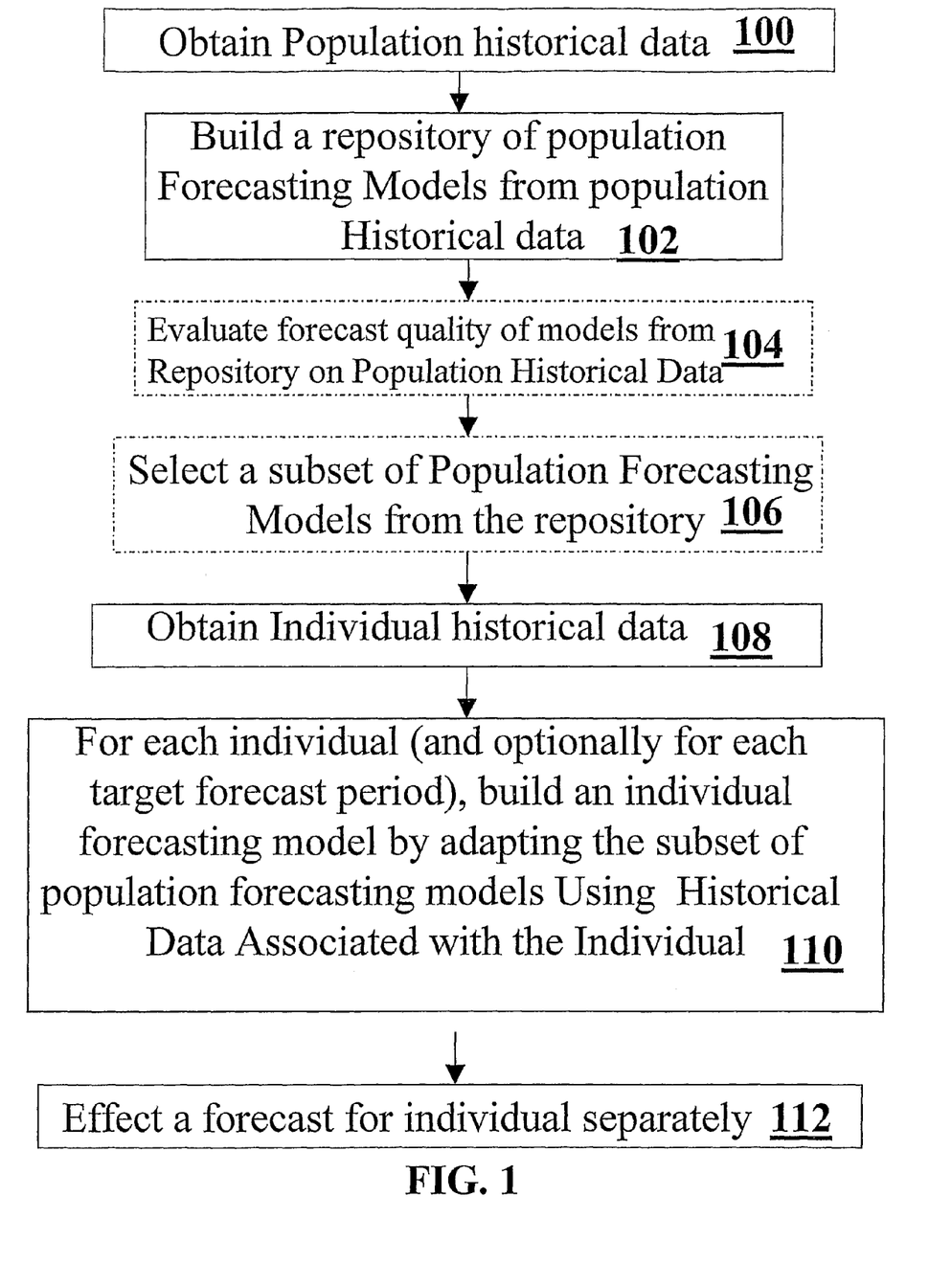
FIG. 1 provides an overview of methods according to some embodiments of the present invention.

$\beta$ is a dummy variable to iterate among these time series related to a single individual;

$\gamma$ is a dummy variable representing a discrete point in time;

FIG. 1 provides an overview of methods according to some embodiments of the present invention. In step 100 population historical data is obtained, and in step 102 a repository of population forecasting models is built from the population historical data. For specific embodiments wherein not all forecasting models from the repository are to be used (e.g. because of computational resources constraints, because some models are poor, etc.), a subset of population forecasting models is selected from the repository 106 in accordance with evaluated forecast quality of models (step 104).

According to specific embodiments described in FIG. 1, population models from the selected subset 106 are adapted (step 110) to obtained individual historical data 108. In particular, the population models are adapted (step 110) for each given individual for a given forecasting period. The adapted population models, which are valid as individual forecasting models, are used to effect a forecast for each individual 112 separately.

It is noted that the order of steps presented in FIG. 1 is only one possible order in which the method may be implemented. Thus, it will be appreciated, for example, that the individual historical data 108 can be obtained concurrently with or before the obtaining of population historical data 100, the evaluation of forecast quality 104 need not specifically proceed the selection 106 of forecasting models, etc.

Furthermore, it is noted that although the building of a repository of a population of forecasting models from population historical data 102 is recited as a specific step in FIG. 1, this is not a limitation of the present invention. According to some embodiments, appropriate population forecasting models for population historical data are received via a model input.

There is no limitation on the specifics of the forecasting models. According to some embodiments, multiple models are created running the same forecasting algorithm on the same set of population historical data (e.g. time series) using different parameters. For example, in ARIMA different numbers of autoregressive terms may be selected, and each set of parameters yields a different population forecasting model. According to some embodiments, the same exact forecasting algorithm using the same exact forecasting parameters can still yield multiple models when applied to different subsets of the population historical data.

According to some embodiments, different population forecasting models are derived from different specific forecasting algorithms. Exemplary forecasting algorithms include but are not limited to forecasting algorithms derived from statistical algorithms (e.g. ARIMA), expert systems, neural networks, and the like. The providing of the population forecasting model can involve automatic methods, manual methods or any combination thereof. Thus, according to some embodiments, parameters for the forecasting algorithms (e.g. ARIMA parameters) are selected in part by a human expert. Alternatively or additionally, automatic techniques are used, such as application of a genetic algorithm on one or more samples of one or more population time series.

Figure 2:
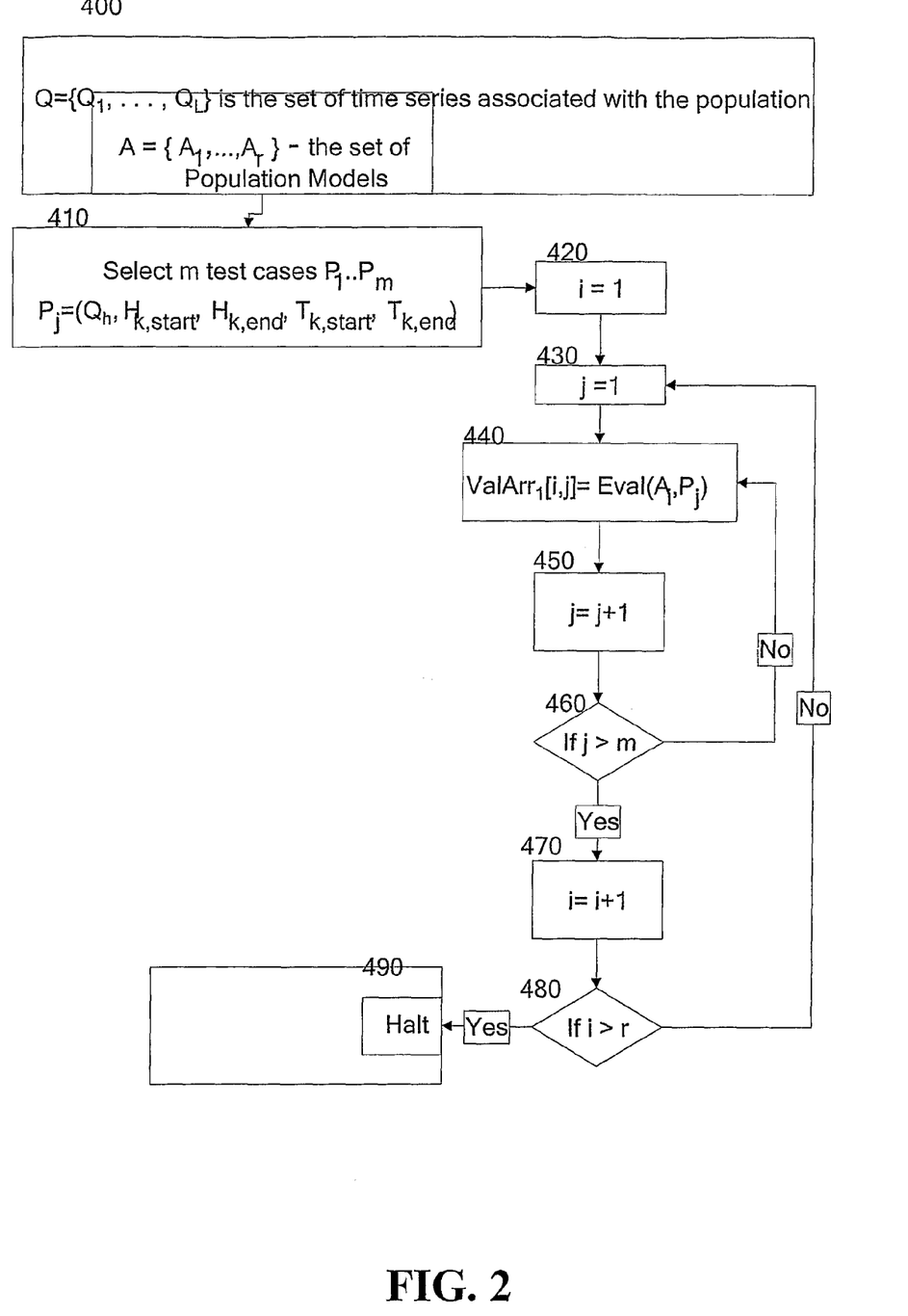
FIG. 2 provides a flowchart describing exemplary implementations for the optional evaluating of forecast quality of models from the repository FIG. 3 provides a flowchart describing exemplary implementations for the optional selecting of a subset of population forecasting models from the repository FIGS. 4-6 describe a method wherein the specific population models are adapted for a single individual for a single forecasting period.

FIG. 2 provides a flowchart describing exemplary implementations for the optional evaluating of forecast quality of models from the repository 104. The input data includes a set of time series associated $Q_1 \ldots Q_L$ associated with the population.

Thus, as described in FIG. 2 m population test cases $P_1 \ldots P_m$ are selected 410, wherein each population test case is represented as a specific time series $Q_h$, a history period, and a test forecast period. The history period is denoted by two indexes in the time series, $H_{k,start}$ and $H_{k,end}$. The interval $[H_{k,start}, H_{k,end}]$ should denote an existing interval of points in the population time series Q. The test-forecast period is denoted by two indexes in the time series, $T_{k,start}$ and $T_{k,end}$, and the test forecast period must be posterior to the history period ($H_{k,end} < T_{k,start}$). The true values of the time series for the test forecast period must be available. Thus, each test case $P_j$ is given as a five-tuple ($Q_h$, $H_{k,start}$, $H_{k,end}$, $T_{k,start}$, $T_{k,end}$). The assignment of a specific dummy index j to a specific five-tuple is a one to one mapping, and otherwise, can be arbitrary.

The selection of appropriate test cases (step 410) may be carried out by any method known in the art. Thus, according to some embodiments, test cases are selected randomly by randomly selecting the history and the test forecasting period. Alternatively or additionally, test cases are selected based on domain knowledge. In one particular example, it is known that there is a correlation between certain behavior in the historic data (e.g. consumption of the commodity) and certain months of the year. Thus, domain knowledge may be used in order to select test cases appropriately.

Alternatively or additionally, based on properties previously discovered, different algorithms such as genetic algorithms are used to learn which test cases are good test cases for predicting the performance of the models in a certain domain of time series. It is further understood that any combination of the aforementioned techniques for selecting test cases is appropriate.

Steps 420 through 480 describes the nested loop where the forecast performance of each model is evaluated using the specific population test cases, where i is the dummy variable to iterate over a total of r population forecast models (see steps 420, 470 and 480) while j is the dummy variable to iterate over a total of m population test cases (see steps 430, 450 and 460). In step 440 the two dimensional array ValArr₁ is set to record the performance of model $A_i$ on test case $P_j$. The evaluation is calculated by a function Eval, and is based on comparing the forecasted values versus the true values in the time series. For the purposes of these examples, the convention that a lower value of Eval indicates a better quality forecast has been adopted. The present invention imposes no specific limitation on the Eval function that is adopted. In one exemplary embodiment, a function Eval returns the sum of the absolute values of the differences between the forecasted values and the true values at each point in the forecast period.

Figure 3:
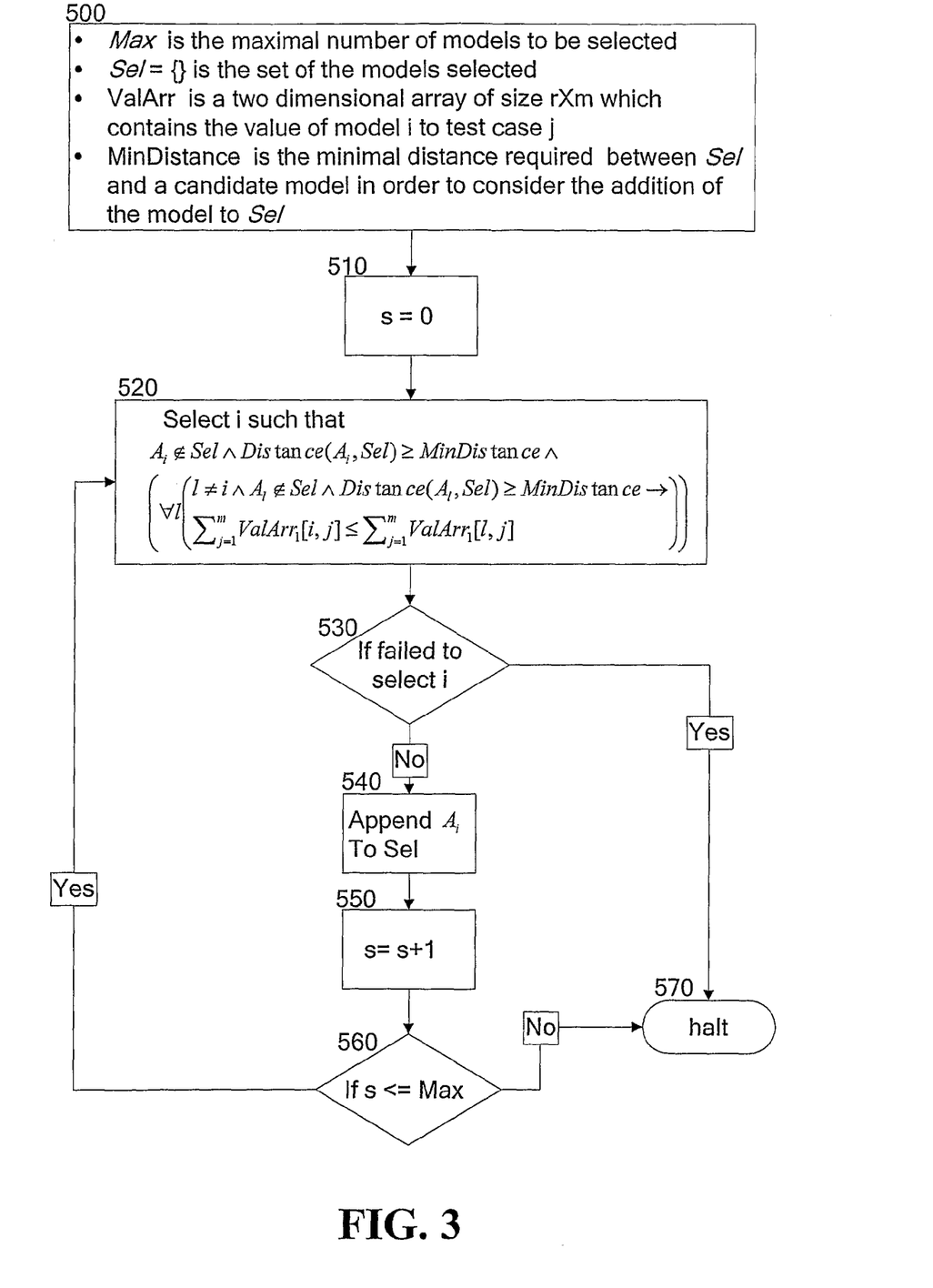

FIG. 3 provides a flowchart describing exemplary implementations for the optional selecting of a subset of population forecasting models from the repository 106. According to some embodiments, a goal of the method of FIG. 3 is to select a subset of performance models such that for each test case there is at least one algorithm instance that gives good forecasts for the test case. According to some embodiments, the selection is carried out automatically. Alternatively or additionally, the selection includes manual selection by a human expert.

Furthermore, it is noted that in FIG. 3 no more than Max models are selected, wherein Max can be chosen according to available computer resources. Thus, as described in step 500 of FIG. 3, Sel represents the set of models already selected from the repository of forecasting models, where Sel is by definition a subset of the total set of models in the repository. Sel is a set of size s, and Steps 510, 550, and 560 serve to ensure that the size of Sel does not exceed Max.

MinDistance is the minimal distance required between Sel and a candidate model in order to consider the addition of the model to Sel. MinDistance is used to ensure that the set Sel will not be populated by models that give predictions too homogenous not covering all the test cases, choosing a larger MinDistance imposes a more stringent requirement of non-redundancy between a given model $A_i$ to be appended to Sel and Sel. The mathematical expression for this redundancy is given in step 520 by Distance ($A_i$,Sel).

In step 520, specific a model $A_i$ is selected for appending to Sel if it meets the following conditions: the model $A_i$ must have not already been selected, e.g. $A_i \notin$ Sel, the model $A_i$ must exhibit a minimum non-redundancy relative to previously selected models is Sel, e.g. Distance($A_i$,Sel)$\geq$MinDistance, and the model $A_i$ must be the model with the best forecast quality, e.g. $\Sigma_{j=1}^{m}$ValArr₁[i, j]$\leq \Sigma_{j=1}^{m}$ValArr₁[l, j] amongst all previously non-selected models $A_l$ meeting the non-redundancy requirement, e.g. Distance($A_l$,Sel)$\geq$MinDistance. Furthermore, it will be appreciated that the aforementioned criteria for best forecast quality and non-redundancy and exemplary criteria, and other appropriate forecast quality and/or redundancy criteria may be employed.

Upon selection of the appropriate model $A_i$, this model is appended to the set of selected models Sel, and the variable measuring the size of Sel is incremented. In the event that no such model was selected (step 530) or if the size of set of previously selected models Sel exceed Max (step 560), there is no more selection of models (step 570).

It is noted that the exemplary selection process described in FIG. 3 is a greedy selection process, though it will be appreciated that for certain applications, selection processes other than greedy selections processes may be employed. According to some embodiments, for example, genetic algorithms selection algorithms are employed to select a subset of models.

After selecting a subset of population models in the original repository (step 106) for the population (or population of time series), it is possible to adapt the selected models according to individual historical data (step 108) for each individual of interest. Thus, for each individual (or for each individual time series), an individual forecasting model is built 110 by adapting the subset of population forecasting models using historical data associated with the individual.

Towards this end, the performance of the selected population models is evaluated for each individual or time series of interest, and the forecasts are then combined into a single forecast, adapted or optimized for the individual. This adaptation is carried out according to the performance of the different models on the test cases relevant for the individual.

It is noted that this adaptation can be accomplished using any appropriate method, and in the following figures an exemplary technique is presented. According to this exemplary technique, the models that perform best on the test cases are given greater consideration or weight when building the combined individual-specific model. This weight is determined according to the success of a population model for the individual specific test cases.

Figure 4:
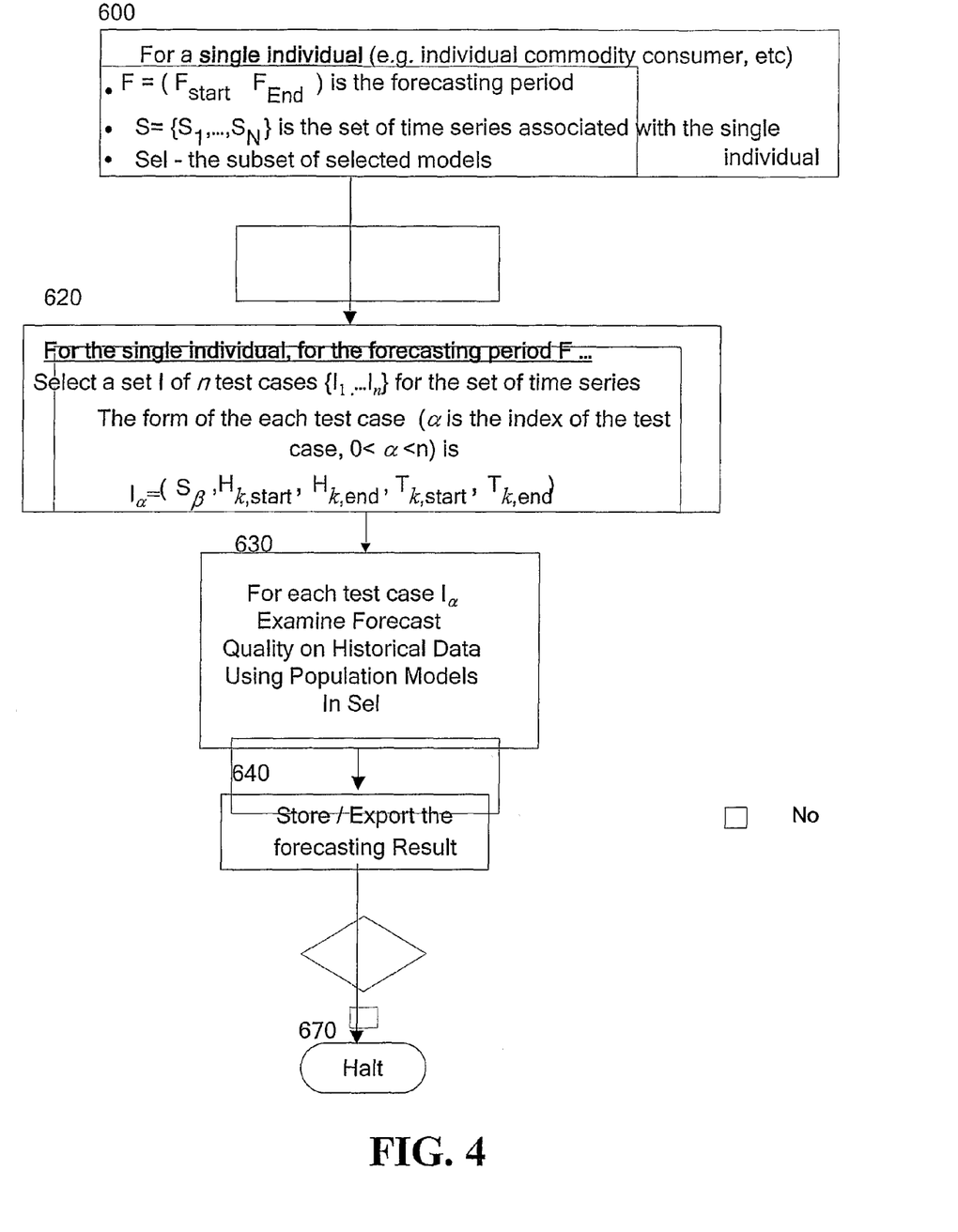
Figure 5:
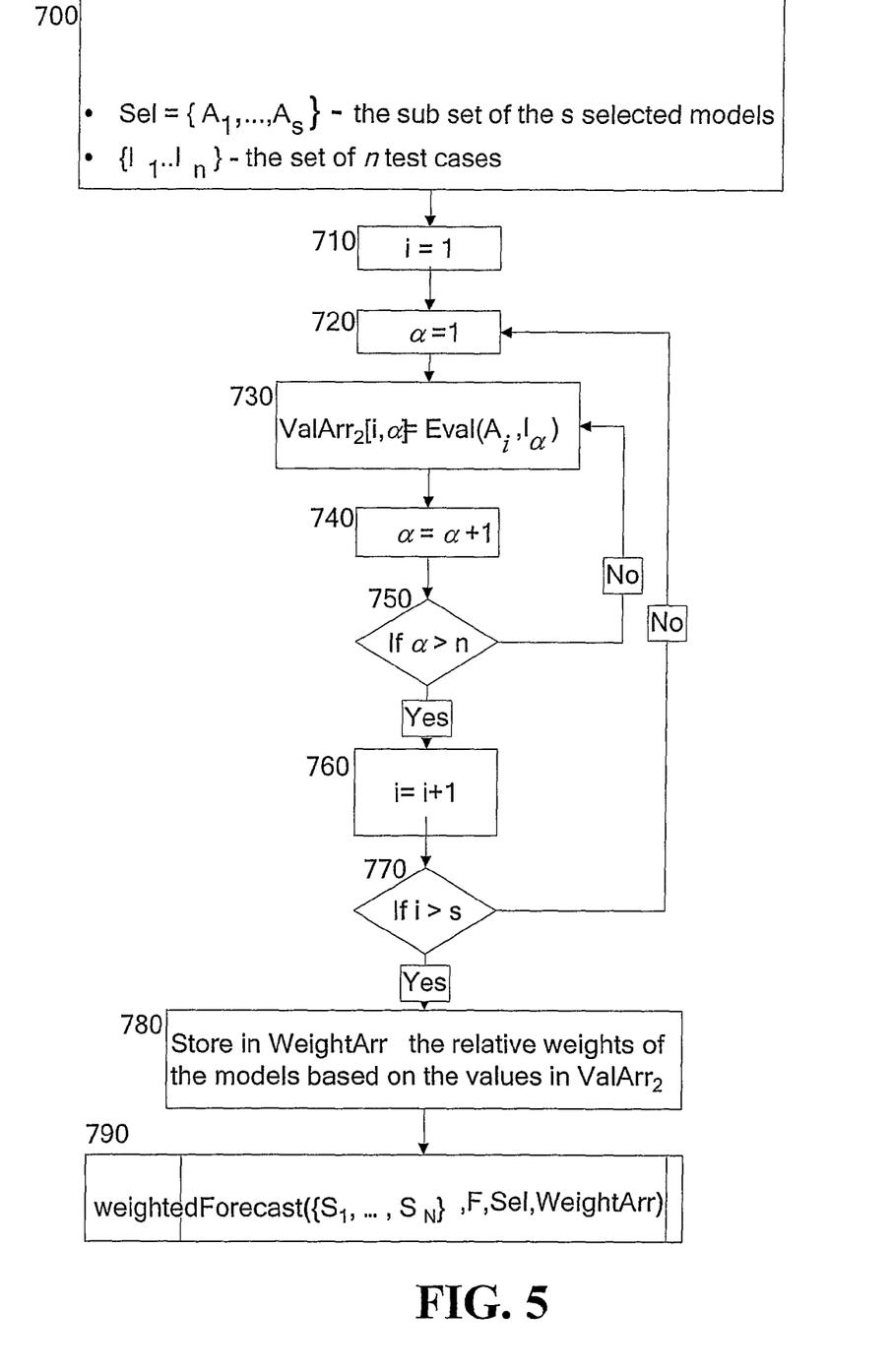
Figure 6:
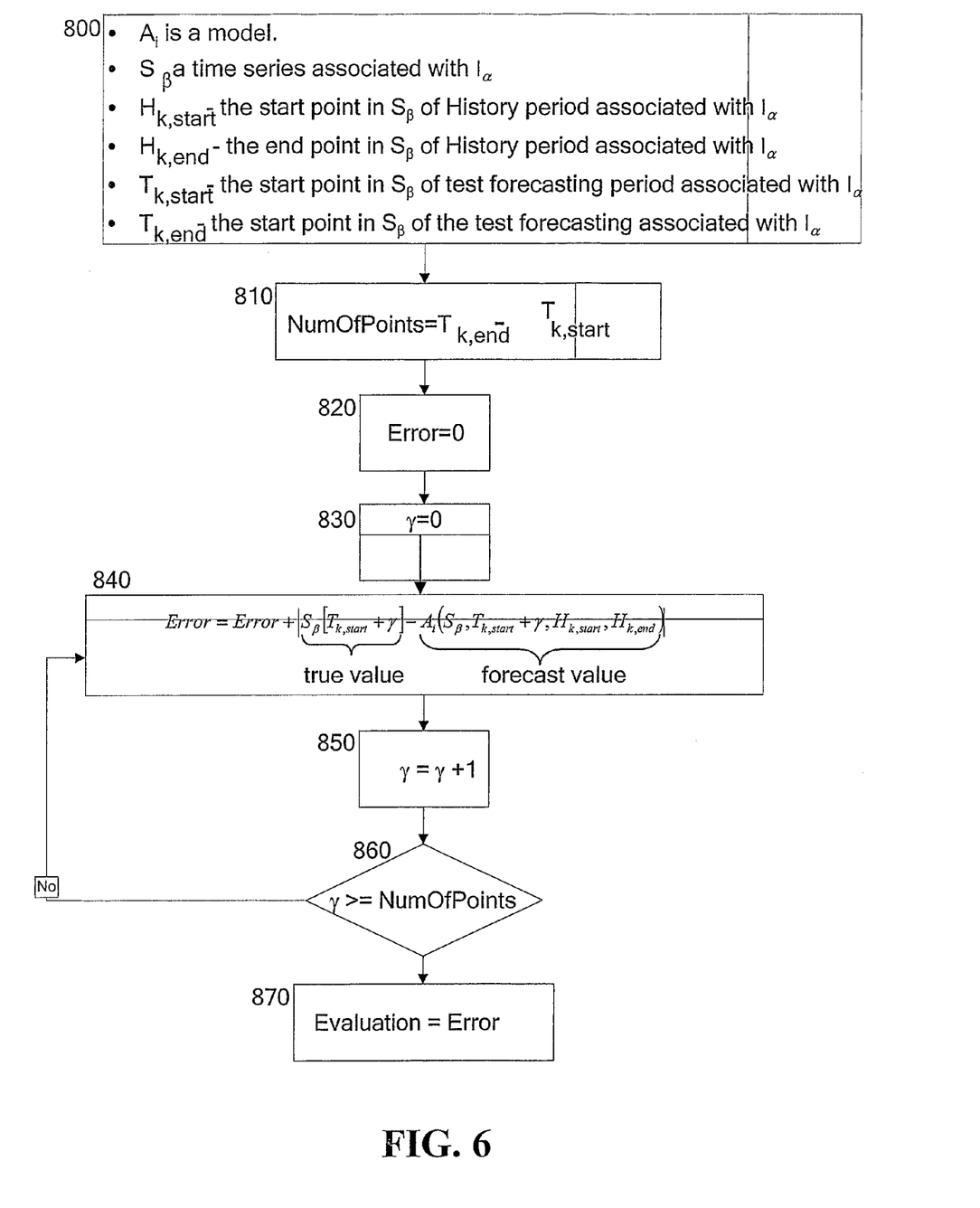

FIGS. 4-6 describe a method wherein the specific population models are adapted for a single individual for a single forecasting period. Although no iteration among a plurality of individuals and/or a plurality of forecasting of periods is described, it is understood that any of the methods presented for a single individual and/or a single forecasting period can be repeated for any number of individuals and for any number of forecasting periods.

Referring to FIG. 4, for each individual, individual historical data is available as a set of time series S. Throughout FIG. 4, $S_1 \ldots S_N$ refers to N time series associated with a single individual where N is an integer greater than or equal to 1 (e.g. a time series representing historical consumption of the commodity by a particular individual). Thus, in FIG. 4 the specific forecast for all test cases $I_\alpha$ associated with a single individual for a single forecast period and for selected population forecast models in Sel is evaluated 630 and stored 640. Step 620 specifies how the models are evaluated on the individual historical data, namely that for each individual specific individual test cases $I_1, \ldots I_n$ are selected on which the population forecast models are analyzed, where the variable $\alpha$ denotes a dummy index to iterate historical individual test cases $I_\alpha$. Each specific individual test case is thus associated with a specific time series $S_\beta$, a history period, and a test forecast period. The history period is denoted by two indexes in the time series, $H_{k,start}$ and $H_{k,end}$, where the variable k denotes a dummy index to iterate pairings between a historical period and a forecast period. The interval $[H_{k,start}, H_{k,end}]$ should denote an existing interval of points in the given time series j. The test-forecast period is denoted by two indexes in the time series, $T_{k,start}$ and $T_{k,end}$, and the test forecast period must be posterior to the history period ($H_{k,end} < T_{k,start}$). The true values of the time series for the test forecast period must be available.

The selection of appropriate test cases (step 620) may be carried out by any method known in the art. Thus, according to some embodiments, test cases are selected randomly by randomly selecting the history and the test forecasting period. Alternatively or additionally, test cases are selected based on domain knowledge. In one particular example, it is known that there is a correlation between certain behavior in the historic data (e.g. consumption of the commodity) and certain months of the year. Thus, domain knowledge may be used in order to select test cases appropriately.

Alternatively or additionally, based on properties previously discovered, different algorithms such as genetic algorithms are used to learn which test cases are good test cases for predicting the performance of the models in a certain domain of time series. It is further understood that any combination of the aforementioned techniques for selecting test cases is appropriate.

FIG. 5 describes a method where the array $ValArr_2$ is populated (step 730) with data describing evaluation of an individual selected population forecast model $A_i \in Sel$ on data from the n individual-specific test case $I_\alpha$ relating to a single individual for a single forecasting period F. It is noted that in step 730 that the evaluation is based on comparing the forecasted values during the historical test forecasting period $[T_{k,start}, T_{k,end}]$ with the true values during this test forecasting period for a specific test case. Different Eval functions may be used. One exemplary Eval returns the sum of the absolute values of the differences between the forecasted values and the true values at each point $\gamma$ in the test forecast period, as described in FIG. 6. It is understood that other Eval functions are appropriate for certain embodiments.

It is noted that step 750 relates to the fact that a total of n individual-specific test cases are analyzed in FIG. 5, using a total of s population models (the size of set Sel) (see step 770).

After the two dimensional array $ValArr_2$ is populated with the appropriate values, the performance values of the various population models on individual test cases as recorded in the array $ValArr_2$ are utilized in order to populate (step 780) the one dimensional array WeightArr of size s. The weighting functions are calculated based on the performance of each model on the test cases. Any method known in the art for deriving or calculating values of WeightArr is appropriate for the present invention. In one exemplary embodiment, the model that performed best in the greatest number of test cases is given a weight 1 and all other models are given a weight 0, thereby allowing for selection of one particular population model for a given individual with a given forecasting period though it is understood that other more methods are appropriate.

The array WeightArr provides relative weights of the population models appropriate or adapted for the individual Thus, according to exemplary embodiments presented, the individual forecast model created for which future values (e.g. commodity consumption) for the particular individual are to be forecast (step 790) for a given forecast period F is represented by the set of population models Sel and the weight array WeightArray. Exemplary implementations for step 790 are described in FIG. 7.

FIG. 6 describes exemplary embodiments for evaluating the performance of a given population forecast model $A_i$ on a given test case $I_\alpha$, e.g. an exemplary implementation of step 730. FIG. 6 relates to the particular case wherein N=1 (e.g. an individual associated with a single time series $S_\beta$) though it is understood that this could be generalized to embodiments wherein an individual is associated with more than one time series (e.g. N>1). In FIG. 6, there are a fixed number of points (NumOfPoints) during the historical forecast period, and the dummy variable $\gamma$ iterates over the points during the historical forecast period.

Figure 7:
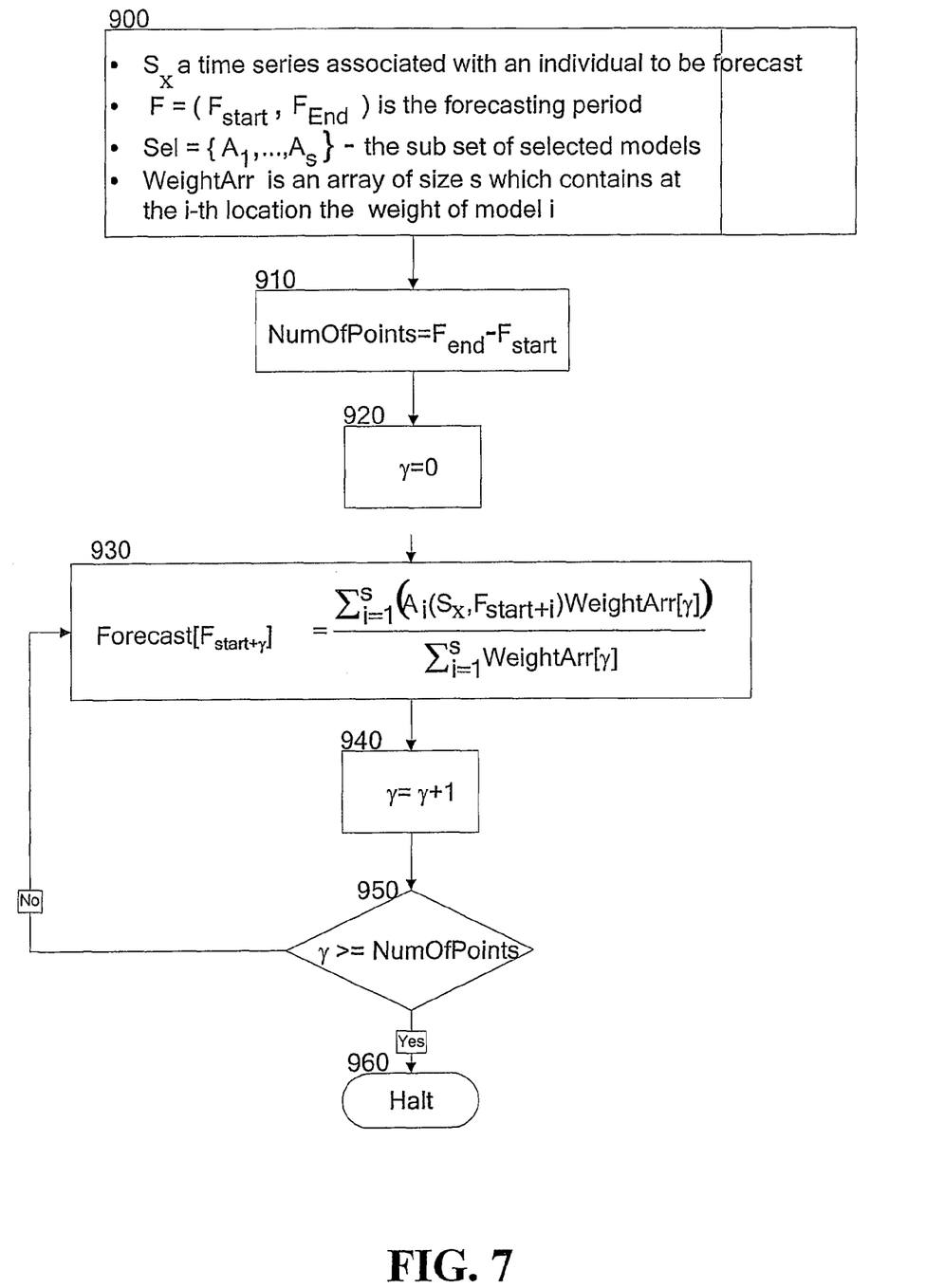
FIG. 7 provides a method for forecasting a selected time series $S_x$ during the forecast period.

According to the exemplary embodiments of FIG. 6, Eval returns the sum of the absolute values of the differences between the forecasted values and the true values at each point $\gamma$ in the test forecast period. The error at a given point is given in the formula of 840 which is the absolute value of the difference between the value forecast by model $A_i$ in $S_\beta$ and the real value of this point in the time series. It is noted that FIG. 6, and in particular step 870 continues to follow the convention that a lower value of Eval indicates a better quality forecast has been adopted FIG. 7 provides a method for forecasting a selected time series $S_x$ during the forecast period. For any given point, the forecast is the weighted average of the forecast according to the various population forecasting models in Sel (step 930). Once again, it is noted that although FIG. 7 describes an exemplary embodiment wherein a single time series is forecast, this is easily generalizable to situations wherein some combination of a plurality of time series represents a forecasted quantity for an individual Some embodiments of the present invention provide systems for implementing any of the aforementioned methods.

Figure 8:
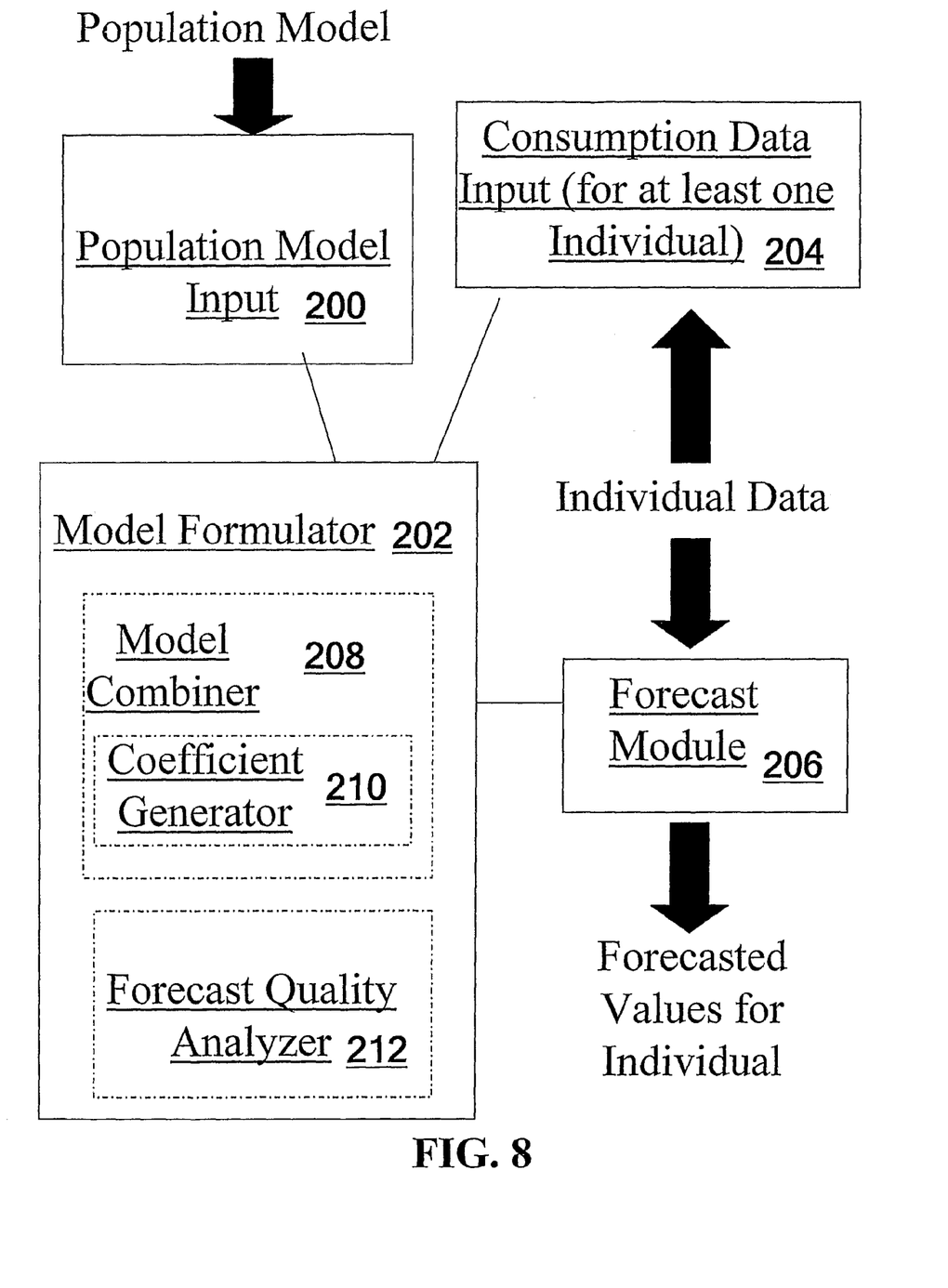
FIG. 8 provides a block diagram of an exemplary forecasting system according to some environments of the present invention.

FIG. 8 provides a block diagram of an exemplary forecasting system according to some embodiments of the present invention.

In the two phrases "less-recent historical time period" and "more-recent historical time period" the words "less" and "more" are to be taken as relative to one another. Accordingly, when these two phrases appear near each other in the same sentence, each of the two phrases is to be interpreted relative to the nearest other of the two phrases in the same sentence.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A computer program product encoding a computer program stored on a non-transitory computer readable storage medium for executing a process on a digital computer processor, the process comprising a set of instructions for forecasting commodity consumption by a target individual of a large population of a size of at least on the order of magnitude of one million individuals, the large population including individuals exhibiting irregular historical consumption patterns of a commodity, the target individual not necessarily having a commodity consumption pattern representative of the large population, wherein the set of instructions comprises instructions for:
   a) selecting, from the large population of individuals having a size on the order of magnitude of one million, a representative sub-set of the population, the representative sub-set of the population, when combined with the target individual, not required to coincide with the large population;
   b) providing historical consumption data describing actual historical consumptions of the commodity by the representative sub-set of the large population during one or more less-recent historical time period(s) and during one or more more-recent historical time periods(s);
   c) for a plurality of commodity consumption forecast models, evaluating, for the specific case of the representative sub-set selected in step (b), performance of each forecast model of the plurality of forecast models by determining the ability of each forecast model of the plurality of commodity consumption forecast models to predict:
      i) consumption of the commodity by the representative population sub-set during the more-recent historical time period(s) from
      ii) data describing consumption of the commodity by the representative population sub-set during the less-recent historical time period(s)
   d) according to the results of the forecast performance evaluating of step (c), selecting a sub-plurality of commodity consumption forecast models from the plurality of consumption forecast models;
   e) for the target individual of the large population, providing historical consumption data describing actual historical consumptions of the commodity by the target individual during one or more less-recent historical time period(s) and during one or more more-recent historical time periods(s), the historical consumption data of the target individual not necessarily representative of the large population or of the representative sub-set of the large population;
   f) for the selected sub-plurality of commodity consumption forecast models, evaluating, for the specific case of the target individual, performance of each forecast model of the sub-plurality of forecast models by determining the ability of each forecast model of the sub-plurality to predict:
      i) consumption of the commodity by the target individual during the more-recent historical time period(s) from
      ii) data describing consumption of the commodity by the target individual during the less recent historical time period(s);
   g) formulating a combined forecasting model adapted for the target individual that includes at least some forecast models of the sub-plurality weighted for the target individual, in accordance with the results of the model performance-evaluating for the specific case of the target individual; and
   h) forecasting, future consumption of the commodity by the target individual using the combined forecast model.

2. The computer program product of claim 1 wherein the consumed commodity is network bandwidth in a telecommunications network.

3. The computer program product of claim 1 wherein the consumed commodity is water provided by a metered water-delivery system.

4. The computer program product claim 1 wherein the consumed commodity is electricity provided by a metered electricity-delivery system.

5. The method computer program product claim 1 wherein at least steps (e)-(g) are repeated a plurality of times for a plurality of different target individuals, each being associated with a different respective historical consumption pattern of the commodity, thereby obtaining a plurality of different forecasts of future consumptions of the commodity.

6. The method computer program product of claim 1 wherein the performance evaluating of step (c) includes:
   i) applying each commodity consumption model of the plurality of models to historical consumption data for the representative sub-set of the population during less-recent historical time period(s) in order to generate a test forecast of the consumption of the commodity by the representative sub-set during the more- recent historical time period(s); and
   ii) comparing the test forecasts to the actual historical consumptions of the commodity by the representative sub-set of the large population during the more-recent historical time period(s).

7. The computer program product claim 1 wherein the selecting the sub-plurality of commodity consumption forecast models from the plurality of consumption forecast models is done using model redundancy between models of the plurality of forecast models.

8. A system for forecasting commodity consumption by a target individual of a large population of a size of at least on the order of magnitude of one million individuals, the large population including individuals exhibiting irregular historical consumption patterns of a commodity, the target individual not necessarily having a commodity consumption pattern representative of the large population, the system comprising:
   a) a data storage including at least one of volatile and non-volatile memory configured to store:

i) a description of a representative sub-set of the population selected from the large population of individuals having a size at least on the order of magnitude of one million, the representative sub-set of the population, when combined with the target individual, not required to coincide with the large population;

ii) historical consumption data describing actual historical consumptions of the commodity by the representative sub-set of the large population during one or more less-recent historical time period(s) and during one or more more-recent historical time periods(s);

iii) a description of a plurality of commodity consumption forecast models; and iv) historical consumption data describing actual historical consumptions of the commodity by the target individual during one or more less-recent historical time period(s) and during one or more more-recent historical time periods(s), the historical consumption data of the target individual not necessarily representative of the large population or of the representative sub-set of the large population;

b) a digital computer processor; and c) computer code stored on a computer-readable medium, the digital computer processor and the computer code configured such that execution of the computer code by the digital computer processor effects the following steps:

i) selecting the representative sub-set of the population from the large population of individuals having a size at least on the order of magnitude of one million;

ii) for the plurality of commodity consumption forecast models, evaluating, for the specific case of the representative sub-set selected in step (i), performance of each forecast model of the plurality of forecast models by determining the ability of each forecast model of the plurality of commodity consumption forecast models to predict:

A) consumption of the commodity by the representative population sub-set during the more-recent historical time period(s) from B) data describing consumption of the commodity by the representative population sub-set during the less-recent historical time period(s)

iii) according to the results of the forecast performance evaluating of step (ii), selecting a sub-plurality of commodity consumption forecast models from the plurality of consumption forecast models;

iv) for the selected sub-plurality of commodity consumption forecast models, evaluating, for the specific ease of the target individual, performance of each forecast model of the sub-plurality of forecast models by determining the ability of each forecast model of the sub-plurality to predict:

A) consumption of the commodity by the target individual during the more-recent historical time period(s) from B) data describing consumption of the commodity by the target individual during the more recent historical time period(s); and v) formulating a combined forecast model adapted for the target individual from that includes at least some forecast models of the sub-plurality weighted, for the target individual, in accordance with the results of the model performance-evaluating for the specific case of the target individual; and vi) forecasting future consumption of the commodity by the target individual using the combined forecast model.

9. The system of claim 8 wherein the consumed commodity is network bandwidth in a telecommunications network.

10. The system of claim 8 wherein the consumed commodity is water provided by a metered water-delivery system.

11. The system of claim 8 wherein the consumed commodity is electricity provided by a metered electricity-delivery system.

12. The system of claim 8 wherein either the digital computer processor or the computer code stored on the computer-readable medium or the digital computer processor and the computer code are configured such that at least steps (iv)-(vi) are repeated a plurality of times for a plurality of different target individuals, each being associated with a different respective historical consumption pattern of the commodity, thereby obtaining a plurality of different forecasts of future consumptions of the commodity.

13. The system of claim 8 wherein either the digital computer processor or the computer code stored on the computer-readable medium or the digital computer processor and the computer code are configured such that the performance evaluating of step (ii) includes:

i) applying each commodity consumption model of the plurality of models to historical consumption data for the representative sub-set of the population during less-recent historical time period(s) in order to generate a test forecast of the consumption of the commodity by the representative sub-set during the more-recent historical time period(s); and ii) comparing the test forecasts to the actual historical consumptions of the commodity by the representative sub-set of the large population during the more-recent historical time period(s).

14. The system of claim 8 wherein either the digital computer processor or the computer code stored on the computer-readable medium or the digital computer processor and the computer code are configured such that the selecting the sub-plurality of commodity consumption forecast models from the plurality of consumption forecast models is done using model redundancy between models of the plurality of forecast models.

* * * * *